United States Patent
Shubin et al.

(10) Patent No.: US 8,428,404 B1
(45) Date of Patent: Apr. 23, 2013

(54) OPTICAL DEVICE ON INVERTED, SUBSTRATELESS CHIP

(75) Inventors: Ivan Shubin, San Diego, CA (US); John E. Cunningham, San Diego, CA (US); Ashok V. Krishnamoorthy, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/331,767

(22) Filed: Dec. 20, 2011

(51) Int. Cl.
*G02B 6/10* (2006.01)
*G02B 6/12* (2006.01)

(52) U.S. Cl.
USPC .......... 385/14; 385/1; 385/2; 385/3; 385/129; 385/130; 385/131; 385/132; 385/30

(58) Field of Classification Search ............. 385/1–3, 385/14, 30, 31, 42, 129–132
See application file for complete search history.

(56) References Cited

U.S. PATENT DOCUMENTS

| 7,218,799 | B2* | 5/2007 | Deliwala | 385/8 |
| 2010/0040322 | A1* | 2/2010 | Li et al. | 385/3 |

OTHER PUBLICATIONS

Cary Gunn, "10Gb/s CMOS Photonics Technology", Silicon Photonics, Proc. of SPIE vol. 6125, 2006, p. 612501.
J. E. Cunningham, I. Shubin, X. Zheng, T. Pinguet, A. Mekis, A. V. Krishnamoorthy, "Highly-efficient thermally-tuned resonant filters," Opt. Express, 18 (18), pp. 19055-19063, 2010.
B. Maune, "Electrically tunable ring resonators incorporating nematic liquid crystals as cladding layers", Appl. Phys. Lett., vol. 83, No. 23, 8, 2003.
B. W. Wessels, "Ferroelectric Epitaxial Thin Films for Integrated Optics", Annu. Rev. Mater. Res. 2007. 37, pp. 659-679, 2007.
H. Park, A. W. Fang, S. Kodama and J. E. Bowers, "Hybrid silicon evanescent laser fabricated with a silicon waveguide and III-V offset quantum wells," Opt. Express 13 9460-9464, 2005.

* cited by examiner

*Primary Examiner* — Brian Healy
*Assistant Examiner* — Mary El Shammaa
(74) *Attorney, Agent, or Firm* — Park, Vaughan, Fleming, Dowler LLP

(57) ABSTRACT

A hybrid integrated module includes a semiconductor die mechanically coupled face-to-face to an integrated device in which the substrate has been removed. For example, the integrated circuit may include an optical waveguide that conveys an optical signal, which is fabricated on a silicon-on-insulator (SOI) wafer in which the back-side silicon substrate or handler has been completely removed. Moreover, an optical device may be disposed on the bottom surface of an oxide layer (such as a buried-oxide layer) in the integrated device, and the geometry and materials in the integrated device may be selected and/or defined so that the optical signal is evanescently coupled between the optical waveguide and the optical device.

20 Claims, 6 Drawing Sheets

OPTICAL DEVICE ON INVERTED, SUBSTRATELESS CHIP

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to a hybrid integrated module that includes a semiconductor die mechanically coupled to an integrated device in which the substrate has been removed, and in which an optical device is disposed on a back surface of the integrated device.

2. Related Art

Silicon-on-insulator (SOI) technology is often used to implement integrated optical components. In particular, optical components, such as an optical waveguide, can be fabricated in a silicon layer of an SOI wafer, which is separated from a silicon substrate by a silicon-dioxide layer (which is sometimes referred to as a 'buried-oxide' or BOX layer). In order to reduce optical losses in the silicon substrate, typically the thickness of the BOX layer is selected so that an optical signal is completely confined in an optical component in the silicon layer (i.e., an optical mode associated with the optical signal does not extend through the BOX layer).

In principle, SOI wafers also allow electronic circuits to be integrated with the optical components on a common chip. In practice, the design parameters for electronic circuits are often different than those for the optical components. For example, in photonic applications the silicon layer usually has a thickness of 0.2-0.3 µm, and the BOX layer usually has a thickness greater than 0.5 µm. In contrast, in many electronic applications (such as a processor, digital logic, a radio-frequency circuit, memory, etc.) the BOX layer has a thickness as low as 0.1 µm. This thicknesses results in significant evanescent coupling of the optical signal to the silicon substrate, with a commensurate increase in the optical losses due to absorption and scattering in the silicon substrate.

Hence, what is needed is an integrated module that can accommodate optical components and electrical circuits without the above-described problems.

SUMMARY

One embodiment of the present disclosure provides a hybrid integrated module. This hybrid integrated module may include a semiconductor die mechanically coupled face-to-face by an adhesive to an integrated device in which the substrate has been removed. For example, the integrated circuit may include an optical waveguide that conveys an optical signal, which is fabricated on a silicon-on-insulator (SOI) wafer in which the back side silicon substrate or handler has been completely removed. Moreover, an optical device may be disposed on the bottom surface of an oxide layer (such as the buried-oxide or BOX layer) in the integrated device, and the thickness of the semiconductor layer (such as silicon) and the thickness of the oxide layer in the integrated device may be defined so that the optical signal is evanescently coupled between the optical waveguide and the optical device.

Note that the semiconductor die may be a VLSI chip that provides power, and serves as a mechanical handler and/or an electrical driver. More generally, the semiconductor die may include electrical circuits.

In some embodiments, the optical device statically or dynamically modulates the optical signal. For example, the optical device may include an optical modulator. Alternatively or additionally, the optical device may include: an electro-optic material, a liquid crystal and/or a ferroelectric material. This material may statically tune a ring resonator that is included in the semiconductor layer with power consumption that is less than that associated with thermal tuning (for example, the power consumption may be an order of magnitude less). Thus, the optical device may correct variations in an actual resonance wavelength of the ring resonator from a target resonance wavelength.

Moreover, the optical device may include a switch that switches the optical signal.

Furthermore, the optical device may include another optical waveguide that conveys the optical signal across reticle boundaries in the integrated device. In these embodiments, the integrated device may function as a bridge chip.

Additionally, the optical device may include: an optical source that provides the optical signal, a wavelength-selective element or filter, and/or a light-detecting element. Because the optical device is on the back surface of the oxide layer, it may be defined or deposited after the remainder of the hybrid integrated module has been fabricated. As a consequence, the hybrid integrated module may allow materials, such as III-V semiconductors, to be integrated with electronic circuits that are fabricated in a standard CMOS process.

Note that the thickness of the semiconductor layer may be between 0.1 and 4 µm and the thickness of the oxide layer may be less than 0.5 µm. Thus, the evanescent coupling may be achieved by using a thin oxide layer.

In some embodiments, solder balls electrically couple pads on a top surface of the semiconductor die and pads on the top surface of the semiconductor layer, where the adhesive at least in part fills a space between the top surface of the semiconductor die and the top surface of the semiconductor layer. Alternatively or additionally, the integrated device may be mechanically coupled to the semiconductor die using a flip-chip technique.

Another embodiment provides a multi-chip module (MCM) that includes one or more instances of the hybrid module.

Another embodiment provides a system that includes the hybrid integrated module and/or the MCM.

Another embodiment provides a method for fabricating the hybrid integrated module. During this method, the adhesive is applied to the top surface of the semiconductor die. Then, the integrated device is placed on the adhesive. Moreover, the integrated device includes: the semiconductor layer having the top surface, a bottom surface and the thickness, where the top surface of the semiconductor layer is mechanically coupled to the adhesive, and where the semiconductor layer includes the optical waveguide configured to convey the optical signal; the oxide layer having a top surface, the bottom surface and the thickness, which is disposed on the bottom surface of the semiconductor layer; and the optical device disposed on the bottom surface of the oxide layer. Note that the thickness of the semiconductor layer and the thickness of the oxide layer may be defined so that the optical signal is evanescently coupled between the optical waveguide and the optical device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
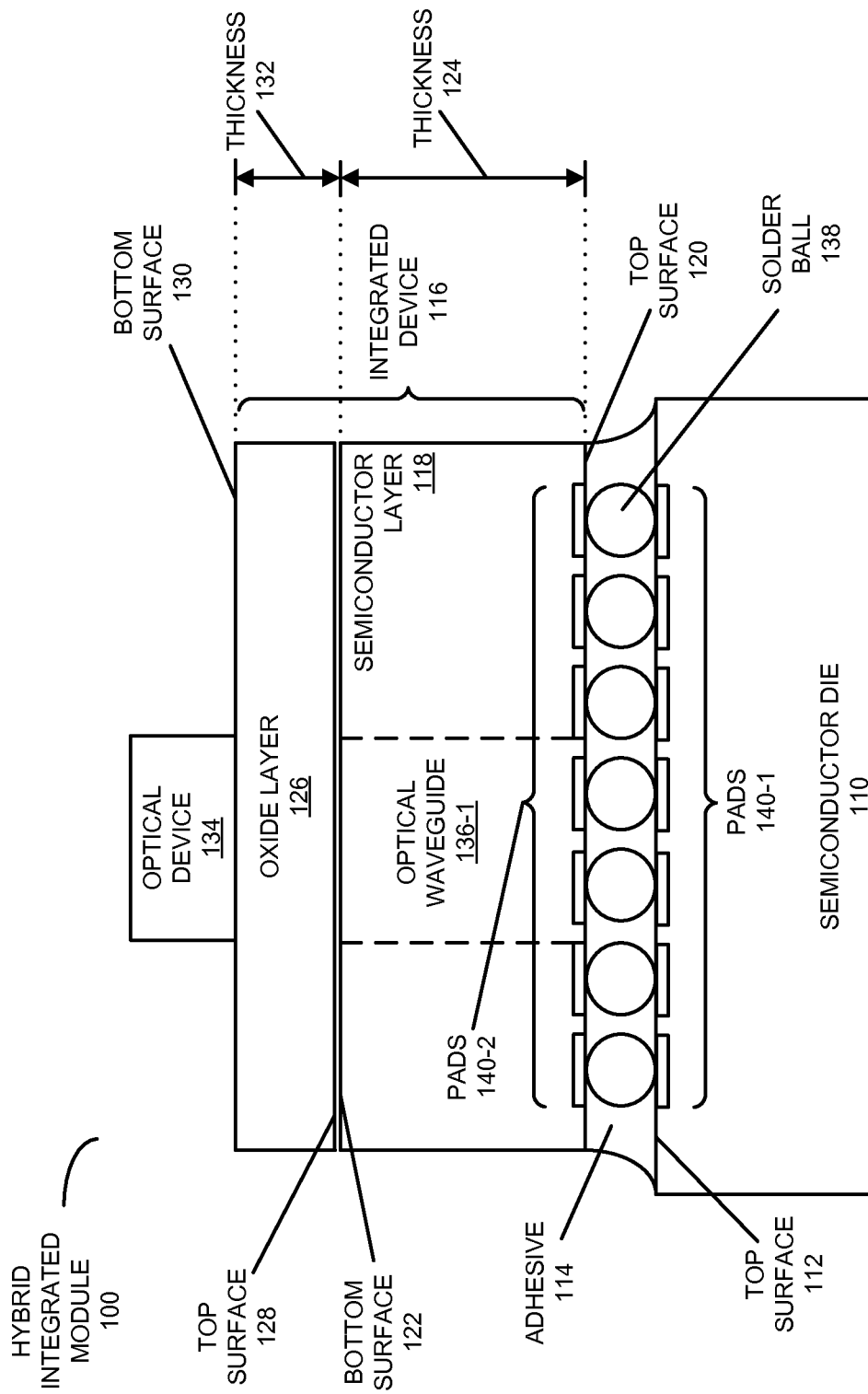
FIG. 1 is a block diagram of a hybrid integrated module in accordance with an embodiment of the present disclosure.

FIG. 1 presents a block diagram of a hybrid integrated module 100. This hybrid integrated module includes: a semiconductor die 110 having a top surface 112, which may include electronic circuits in a dielectric stack; an adhesive 114 (such as epoxy) mechanically coupled to top surface 112 of semiconductor die 110; and an integrated device 116. Moreover, integrated device 116 includes: a semiconductor layer 118 having a top surface 120, a bottom surface 122 and a thickness 124, where top surface 120 is mechanically coupled to adhesive 114, so that semiconductor layer 118 and semiconductor die 110 are mounted face-to-face; an oxide layer 126 having a top surface 128 (which is slightly offset from bottom surface 122 for clarity), a bottom surface 130 and a thickness 132, where top surface 128 is disposed on bottom surface 122; and an optical device 134 disposed on bottom surface 130.

Furthermore, semiconductor layer 118 may include an optical waveguide 136-1 that conveys an optical signal (such as a wavelength-division-multiplexing signal), and the materials and/or geometry of integrated device 116 (such as thicknesses 124 and 132) may be selected and/or defined so that the optical signal is evanescently coupled between optical waveguide 136-1 and optical device 134 (i.e., a spatial extent of an optical mode associated with the optical signal may extend through thickness 132 to bottom surface 130). For example, thickness 124 of semiconductor layer 118 may be between 0.1 and 4 µm and thickness 132 of oxide layer 126 may be less than 0.5 µm (such as 0.1 µm). Thus, the evanescent coupling may be achieved by using a thin oxide layer with a thick silicon layer or a thin silicon layer (the lower bound being approximately one-half of the diffraction limit of the optical signal). Note that because the electrical functions in hybrid integrated module 100 have been physically separated from the optical functions, these functions can be independently optimized. This may facilitate monolithic integration of photonic circuits and electronic circuits without the photonic circuits imposing constraints on thicknesses 124 and 132. Furthermore, because thickness 132 can be reproducibly controlled to better than 1% accuracy, the evanescent coupling can be implemented in a very controlled and accurate manner with minimal optical loss.

By evanescently coupling the optical signal through oxide layer 126 and disposing optical device 134 on bottom surface 130, hybrid integrated module 100 may provide additional design degrees of freedom. In particular, as described further below with reference to FIGS. 2-4, a variety of optical devices may be disposed on bottom surface 130. For example, optical device 134 may include: an optical modulator, an optical switch, an optical source, an optical waveguide, a wavelength-selective element or filter, a light-detecting element, etc. Moreover, optical device 134 may include materials that are not compatible with standard CMOS processing, such as: III-V semiconductors (e.g., a silicon-germanium alloy), an electro-optic material, a liquid crystal and/or a ferroelectric material. While the majority of the components in hybrid integrated module 100 can be fabricated and assembled using CMOS-compatible processing (so that the manufacturing costs are low), the materials on bottom surface 130 may be defined or deposited during post-processing of integrated device 116 at the chip or wafer level (for example, optical device 134 may be deposited or bonded onto oxide layer 126 after front-end-of-line processing is completed in a back-end-of-line complaint process).

Note that the mechanical coupling provided by adhesive 114 may include solder balls, such as solder ball 138 (e.g., bondline micro-bumps or micro-solder), electrically coupling pads 140-1 on top surface 112 and pads 140-2 on top surface 120, where adhesive 114 at least in part fills a space between top surface 112 and top surface 120 (i.e., there may be underfill). In some embodiments, integrated device 116 may be mechanically coupled to semiconductor die 110 using a flip-chip technique.

In an exemplary embodiment, semiconductor layer 118 may include silicon, and oxide layer 126 may include a dielectric or an oxide, such as silicon dioxide. Thus, semiconductor layer 118 and oxide layer 126 may comprise a silicon-on-insulator (SOI) technology in which the semiconductor die on top of oxide layer 126 (such as the silicon-handler substrate) has been removed, for example, by mechanical polish and/or etching. In this way, optical losses associated with the evanescent coupling of the optical signal through oxide layer 126 into the silicon-handler substrate may be eliminated. As a consequence, optical device 134 may be faster, smaller and more power-efficient relative to existing optical components that are implemented using SOI technology.

This fabrication technique may require that thin semiconductor layer 118 be properly mechanically secured. In FIG. 1, this is accomplished by bonding this layer onto semiconductor die 110. Note that this bonding may be performed on a chip-to-chip basis, a chip-to-wafer basis or a wafer-to-wafer basis. As noted previously, semiconductor die 110 may include electronic circuits implemented in silicon, such as: a VLSI chip that provides power, and serves as a mechanical handler and/or an electrical driver; a processor; a radio-frequency circuit; memory; a mixed-signal circuit; and/or a digital circuit.

As discussed previously, optical device 134 may include a wide variety of optical components and/or materials. In some embodiments, optical device 134 statically or dynamically modulates the optical signal. For example, optical device 134 may include an optical modulator. This optical modulator may correct variations in an actual resonance wavelength of the ring resonator from a target resonance wavelength because of process variability and manufacturing tolerances, as well as variations in thickness 124.

Figure 2A:
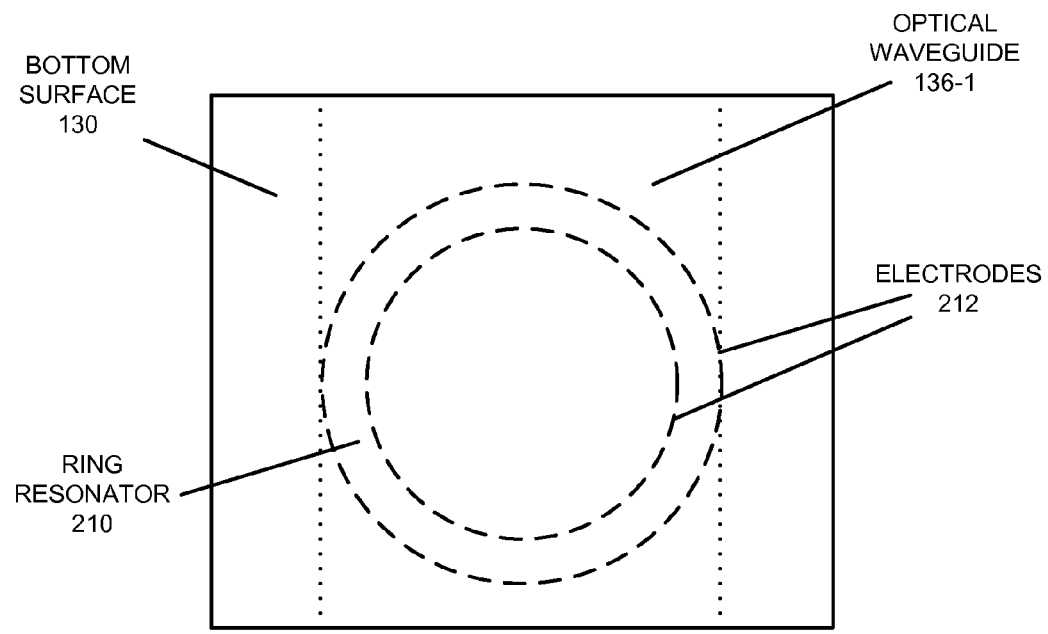
FIG. 2A is a block diagram of a ring resonator in the hybrid integrated module of FIG. 1 in accordance with an embodiment of the present disclosure.
Figure 2B:
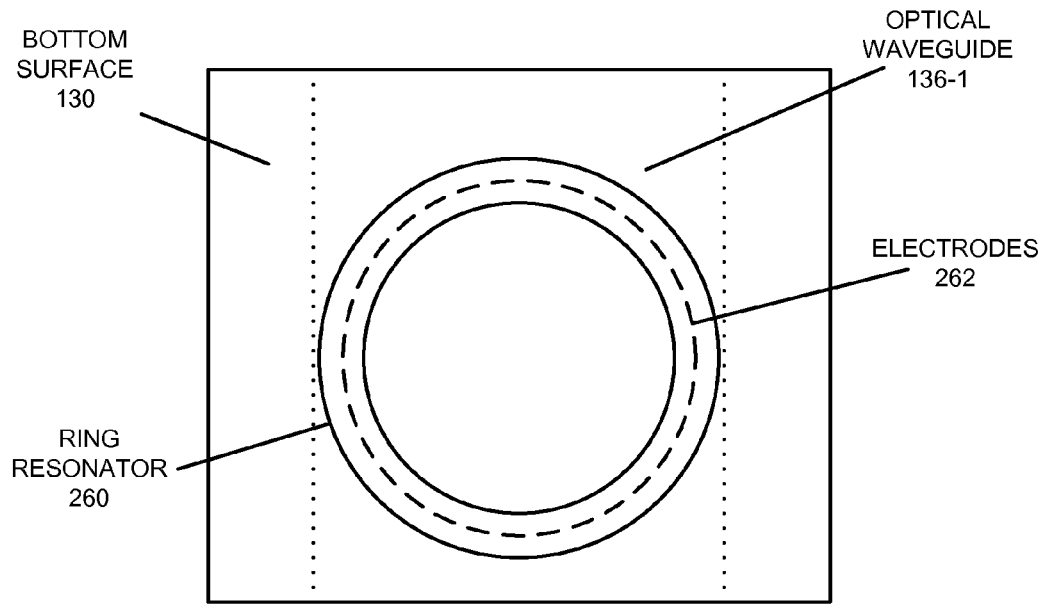
FIG. 2B is a block diagram of a ring resonator in the hybrid integrated module of FIG. 1 in accordance with an embodiment of the present disclosure.

This is shown in FIGS. 2A and 2B, which present block diagrams of ring resonators 210 and 260, respectively, in hybrid integrated module 100 (FIG. 1). These ring resonators may be fabricated on bottom surface 130 immediately above optical waveguide 136-1. Moreover, ring resonators 210 and 260 may be used to modify the index of refraction of the cladding of optical waveguide 136-1 and, thus, to change the optical-waveguide ring-propagation constant of optical waveguide 136-1. For example, an electric voltage may be applied to electrodes 212 or 262 to generate an electric field in a horizontal (FIG. 2A) or a vertical direction (FIG. 2B) in an electro-optic material (such as a ferroelectric material, e.g., barium strontium titanate, lead zirconium titanate or a liquid crystal) or electro-absorber material (such as germanium) in optical device 134 (FIG. 1). In this way, optical device 134 (FIG. 1) may electronically tailor the optical mode of the optical signal via the evanescent tail.

Because no current flows through these structures for resonant-wavelength tuning, the optical device may have far lower power requirements than thermally tuning, even when it is tuned across the entire free-spectral range of ring resonator 210 or 260. In particular, the power consumption may be an order of magnitude smaller (e.g., microWatts instead of milliWatts).

Note that, in order to enable tuning control, electrodes 212 and 262 in ring resonators 210 and 260 may be electrically coupled to semiconductor layer 118 and/or semiconductor die 110 in FIG. 1 (e.g., using through silicon vias).

Figure 3:
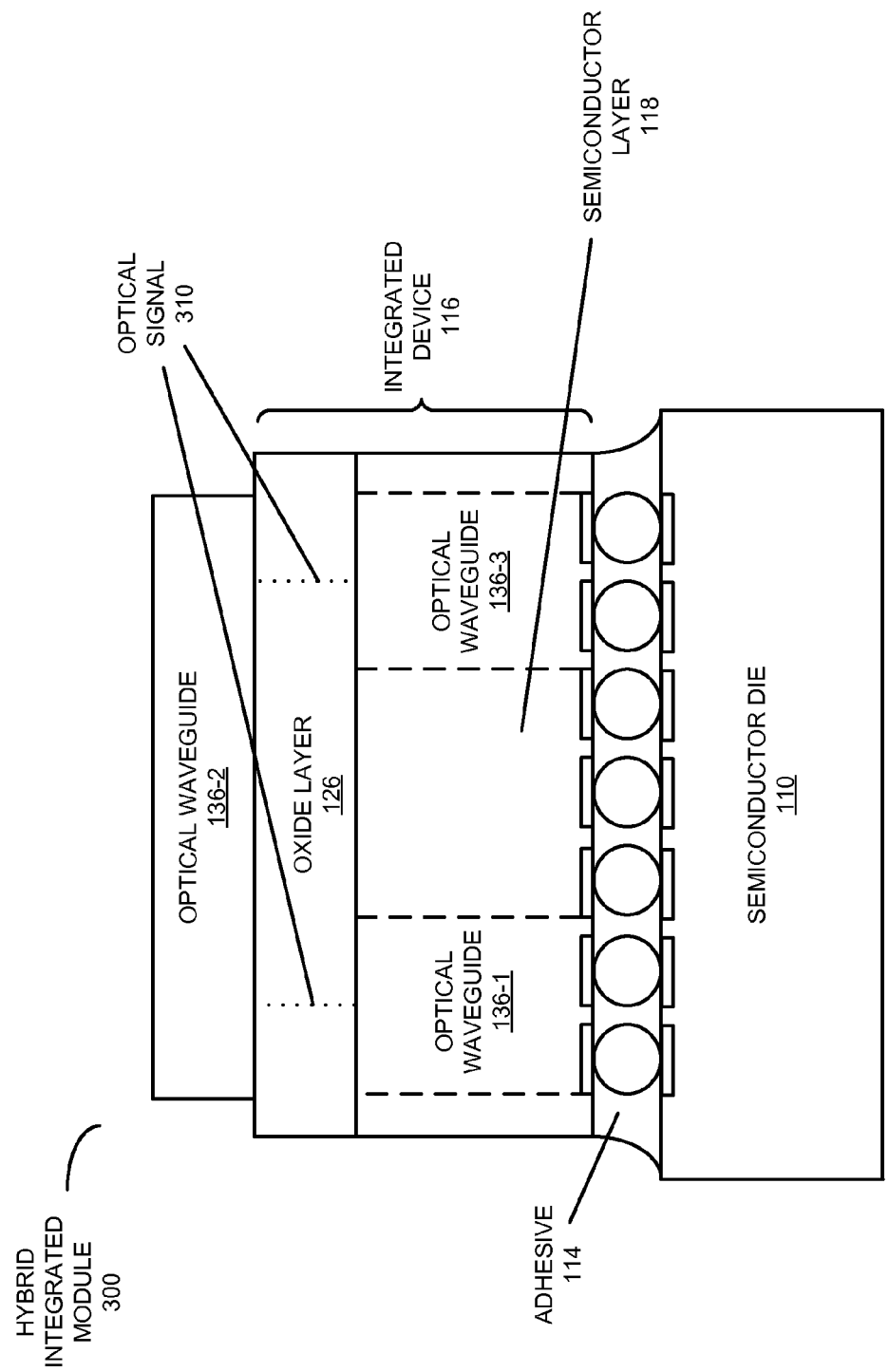
FIG. 3 is a block diagram of a hybrid integrated module in accordance with an embodiment of the present disclosure.

In some embodiments, the optical device includes another optical waveguide that conveys the optical signal across reticle boundaries in the integrated device. This is shown in FIG. 3, which presents a block diagram of a hybrid integrated module 300. Thus, using optical waveguide 136-2, integrated device 116 may function as a 'bridge chip' that optically couples optical signal 310 to multiple chips on a common wafer.

Figure 4:
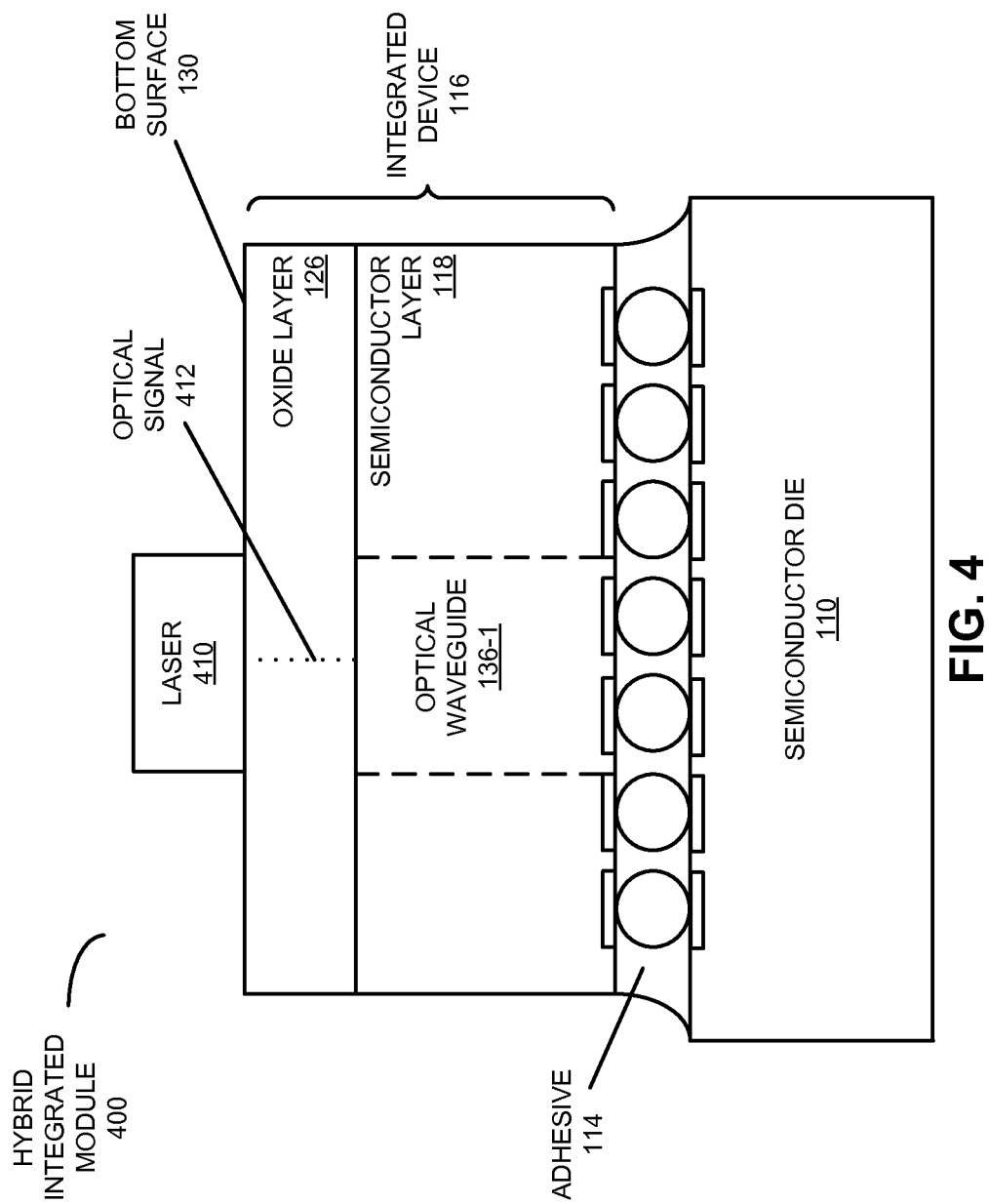
FIG. 4 is a block diagram of a hybrid integrated module in accordance with an embodiment of the present disclosure.

Furthermore, optical device 134 (FIG. 1) may include an optical source that provides the optical signal. This is shown in FIG. 4, which presents a block diagram of a hybrid integrated module 400. In this hybrid integrated module, a III-V semiconductor laser 410 may be bonded on top of bottom surface 130. This laser may be aligned with and situated on top of optical waveguide 136-1. During operation, optical signal 412 output by this laser may be evanescently coupled to optical waveguide 136-1 through oxide layer 126 (FIG. 1).

Note that laser 410 and/or optical waveguide 136-1 may be terminated with appropriately sized tapers to relax the x- and y-alignment tolerances, as well as to accommodate for an optical-mode mismatch between an optical waveguide in optical device 134 (FIG. 1) and optical waveguide 136-1. Furthermore, the efficiency of the evanescent coupling between two adjacent optical waveguides is dependent on the accuracy of the spacing between them. In these embodiments, this spacing is set by thickness 132 in FIG. 1 (which is routinely specified at under 1% in a typical SOI wafer). Such tight thickness tolerance can facilitate optical coupling with low optical loss from laser 410 to optical waveguide 136-1.

Because this integration is to the back side of integrated device 116, the photonic circuits may be completed, along with the necessary dielectric and metal inter-connect layering, and may even be monolithically integrated with electronic circuits, before integration of laser 410. In addition to having more accurate thickness control of the thermally grown oxide layer relative to the front-end silicon-oxide layer, oxide layer 126 is expected to be flat once exposed (e.g., after the silicon substrate-handler is removed) and may not need polishing for planarization. Note that, if needed, through-silicon vias can be placed in oxide layer 126 to connect the front-side circuits to the electrical contacts of laser 410 so that optical device 134 (FIG. 1) can be electronically controlled and stimulated using the front-side circuits.

Referring back to FIG. 1, because optical device 134 is disposed on bottom surface 130, and thus may be accessed from the back side of integrated device 116, the hybrid integrated module may facilitate 3-dimensional integration of additional integrated devices and/or additional hybrid integrated modules, thereby scaling up the component density and facilitating a variety of architectures and applications. For example, one or more additional integrated devices may be stacked on top of integrated device 116 such that the top surface of a semiconductor layer in one of the additional integrated devices faces bottom surface 130 of oxide layer 126 in integrated device 116. Alternatively or additionally, one or more additional hybrid integrated modules may be positioned so that optical devices (such as optical device 134) face each other in a multi-chip module (MCM). This approach can allow large, 2-dimensional arrays of integrated devices to be optically coupled. Note that optical couplers (such as diffraction grating couplers or mirrors) may be defined in semiconductor layer 118 and/or on bottom surface 130 to provide optical coupling to the additional integrated devices and/or the additional hybrid integrated modules. As noted previously, if an instance of the integrated device encompasses more than one chip (i.e., there is a reticle line), optical device 134 may be used to convey the optical signal across the reticle line (i.e., optical device 134 may function as a 'bridge chip').

Figure 5:
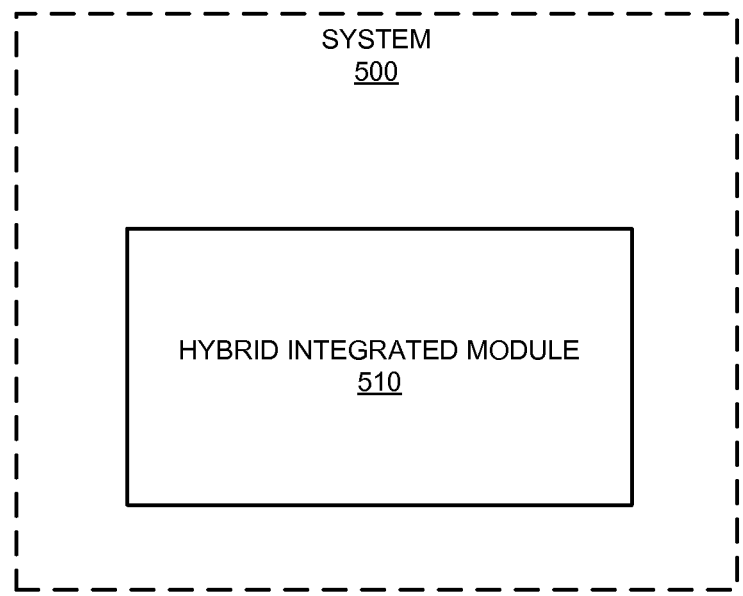
FIG. 5 is a block diagram illustrating a system that includes the hybrid integrated module of FIG. 1, 3 or 4 in accordance with an embodiment of the present disclosure.

One or more of the preceding embodiments of the hybrid integrated module and/or the MCM may be included in a system and/or an electronic device. This is illustrated in FIG. 5, which presents a block diagram illustrating a system 500 that includes hybrid integrated module 510.

The hybrid integrated module and/or the MCM may be used in a variety of applications, including: VLSI circuits, communication systems (such as WDM), storage area networks, data centers, networks (such as local area networks), and/or computer systems (such as multiple-core processor computer systems). Note that system 500 may include, but is not limited to: a server, a laptop computer, a communication device or system, a personal computer, a tablet computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

The preceding embodiments of the hybrid integrated module, the MCM, and/or system 500 may include fewer components or additional components. For example, semiconductor layer 118 in FIG. 1 may include poly-silicon or amorphous silicon. Alternatively or additionally, in conjunction with the surrounding air, there may be an anti-reflective coating on bottom surface 130 except in proximity to optical device 134 (i.e., where evanescent coupling is desired). Furthermore, a wide variety of fabrication techniques may be used to fabricate the hybrid integrated module in the preceding embodiments, as is known to one of skill in the art. In addition, a wide variety of optical components may be used in or in conjunction with the hybrid integrated module.

Note that in some embodiments optical device 134 in FIG. 1 is thermally and/or electrically tuned. Furthermore, while inclusion of optical device 134 in integrated device 116 has been used as an illustrative example, in other embodiments the hybrid integrated module does not include an optical device.

Although these embodiments are illustrated as having a number of discrete items, the embodiments are intended to be functional descriptions of the various features that may be present rather than structural schematics of the embodiments described herein. Consequently, in these embodiments two or more components may be combined into a single component, and/or a position of one or more components may be changed.

Figure 6:
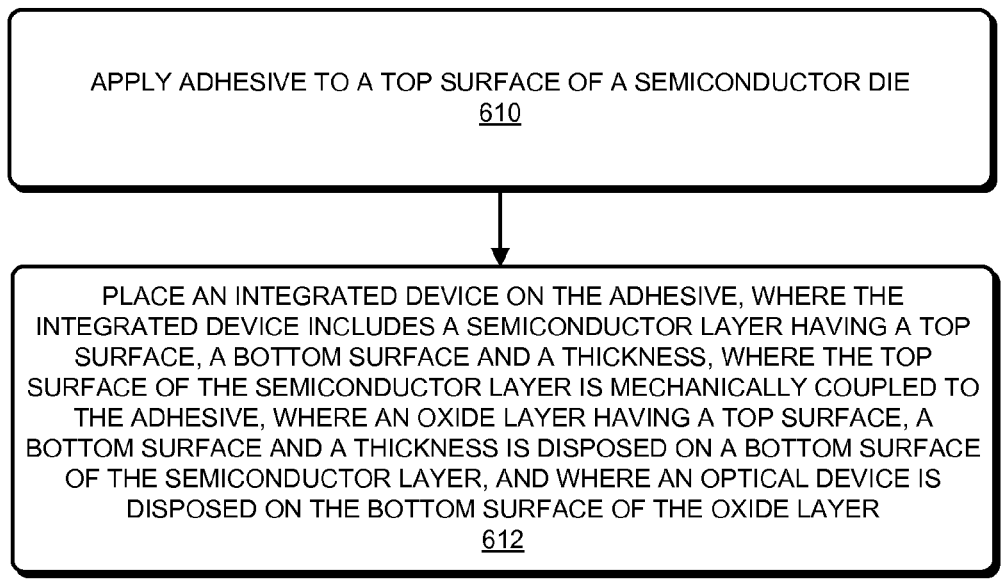
FIG. 6 is a flow chart illustrating a method for fabricating a hybrid integrated module in accordance with an embodiment of the present disclosure.

We now describe embodiments of the method. FIG. 6 presents a flow chart illustrating a method 600 for fabricating the hybrid integrated module. During this method, an adhesive is applied to a top surface of a semiconductor die (operation 610). Then, an integrated device is placed on the adhesive (operation 612). Moreover, the integrated device includes: a semiconductor layer having a top surface, a bottom surface and a thickness, where the top surface of the semiconductor layer is mechanically coupled to the adhesive, and where the semiconductor layer includes an optical waveguide configured to convey an optical signal; an oxide layer having a top surface, a bottom surface and a thickness, which is disposed on the bottom surface of the semiconductor layer; and an optical device disposed on the bottom surface of the oxide layer. Note that the thickness of the semiconductor layer and/or the thickness of the oxide layer may be defined so that the optical signal is evanescently coupled between the optical waveguide and the optical device.

In some embodiments of method 600, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A hybrid integrated module, comprising:
a semiconductor die having a top surface;
an adhesive mechanically coupled to the top surface of the semiconductor die; and
an integrated device, wherein the integrated device includes:
a semiconductor layer having a top surface, a bottom surface and a thickness, wherein the top surface of the semiconductor layer is mechanically coupled to the adhesive, and wherein the semiconductor layer includes an optical waveguide configured to convey an optical signal;
an oxide layer having a top surface, a bottom surface and a thickness, wherein the top surface of the oxide layer is disposed on the bottom surface of the semiconductor layer; and
an optical device disposed on the bottom surface of the oxide layer, wherein the thickness of the semiconductor layer and the thickness of the oxide layer are defined so that the optical signal is evanescently coupled between the optical waveguide and the optical device.

2. The hybrid integrated module of claim 1, wherein the optical device is configured to modulate the optical signal.

3. The hybrid integrated module of claim 2, wherein the optical device is configured to dynamically modulate the optical signal.

4. The hybrid integrated module of claim 1, wherein the optical device includes one of an electro-optic material, a liquid crystal and a ferroelectric material.

5. The hybrid integrated module of claim 1, wherein the semiconductor layer includes a ring resonator and the optical device facilitates tuning of the ring resonator with power consumption less than that associated with thermal tuning.

6. The hybrid integrated module of claim 5, wherein the optical device is configured to correct variations in an actual resonance wavelength of the ring resonator from a target resonance wavelength.

7. The hybrid integrated module of claim 1, wherein the optical device is configured to switch the optical signal.

8. The hybrid integrated module of claim 1, wherein the optical device includes another optical waveguide disposed on the bottom surface of the oxide layer; and
wherein the other optical waveguide is configured to convey the optical signal across reticle boundaries in the integrated device.

9. The hybrid integrated module of claim 1, wherein the optical device includes an optical source disposed on the bottom surface of the oxide layer; and
wherein the optical source is configured to provide the optical signal.

10. The hybrid integrated module of claim 1, wherein the thickness of the semiconductor layer is between 0.1 and 4 µm.

11. The hybrid integrated module of claim 1, wherein the thickness of the oxide layer is less than 0.5 µm.

12. The hybrid integrated module of claim 1, further comprising solder balls electrically coupling pads on the top surface of the semiconductor die and pads on the top surface of the semiconductor layer, wherein the adhesive at least in part fills a space between the top surface of the semiconductor die and the top surface of the semiconductor layer.

13. The hybrid integrated module of claim 1, wherein the integrated device is mechanically coupled to the semiconductor die using a flip-chip technique.

14. The hybrid integrated module of claim 1, wherein the semiconductor layer includes silicon and the oxide layer includes silicon dioxide.

15. The hybrid integrated module of claim 1, wherein the semiconductor layer and the oxide layer comprise a silicon-on-insulator technology in which a second semiconductor die on top of the oxide layer has been removed.

16. A system, comprising a hybrid integrated module, wherein the hybrid integrated module includes:
a semiconductor die having a top surface;
an adhesive mechanically coupled to the top surface of the semiconductor die; and
an integrated device, wherein the integrated device includes:
a semiconductor layer having a top surface, a bottom surface and a thickness, wherein the top surface of the semiconductor layer is mechanically coupled to the adhesive, and wherein the semiconductor layer includes an optical waveguide configured to convey an optical signal having an optical mode;

an oxide layer having a top surface, a bottom surface and a thickness, wherein the top surface of the oxide layer is disposed on the bottom surface of the semiconductor layer; and an optical device disposed on the bottom surface of the oxide layer, wherein the thickness of the semiconductor layer and the thickness of the oxide layer are defined so that the optical signal is evanescently coupled between the optical waveguide and the optical device;

a processor incorporated into one of the semiconductor die and the integrated device; and a memory incorporated into one of the semiconductor die and the integrated device.

17. The system of claim 16, wherein the semiconductor layer includes a ring resonator and the optical device facilitates tuning of the ring resonator with power consumption less than that associated with thermal tuning.

18. The system of claim 17, wherein the optical device is configured to correct variations in an actual resonance wavelength of the ring resonator from a target resonance wavelength.

19. The system of claim 16, wherein the optical device includes an optical source disposed on the bottom surface of the oxide layer; and wherein the optical source is configured to provide the optical signal.

20. A method for fabricating a hybrid integrated module, the method comprising:

applying an adhesive to a top surface of a semiconductor die; and placing an integrated device on the adhesive, wherein the integrated device includes:

a semiconductor layer having a top surface, a bottom surface and a thickness, wherein the top surface of the semiconductor layer is mechanically coupled to the adhesive; and wherein the semiconductor layer includes an optical waveguide configured to convey an optical signal;

an oxide layer having a top surface, a bottom surface and a thickness, wherein the top surface of the oxide layer is disposed on the bottom surface of the semiconductor layer; and an optical device disposed on the bottom surface of the oxide layer, wherein the thickness of the semiconductor layer and the thickness of the oxide layer are defined so that the optical signal is evanescently coupled between the optical waveguide and the optical device.

* * * * *